United States Patent
Menegazzo et al.

(10) Patent No.: US 12,252,079 B2
(45) Date of Patent: Mar. 18, 2025

(54) ASSEMBLY FOR SECURING ELECTRICAL WIRING THROUGH A ROOF OF A VEHICLE

(71) Applicant: ARB Corporation Limited, Kilsyth (AU)

(72) Inventors: Andrew Guy Menegazzo, Kilsyth (AU); James Kenneth Robert Luke, Kilsyth (AU); John Desmond Clark, Kilsyth (AU); Andrew Harry Brown, Kilsyth (AU)

(73) Assignee: ARB Corporation Limited, Kilsyth (AU)

( * ) Notice: Subject to any disclaimer, the term of this patent is extended or adjusted under 35 U.S.C. 154(b) by 325 days.

(21) Appl. No.: 17/713,276

(22) Filed: Apr. 5, 2022

(65) Prior Publication Data

US 2022/0379825 A1    Dec. 1, 2022

(30) Foreign Application Priority Data

Jun. 1, 2021   (AU) ................................ 2021203576

(51) Int. Cl.
  *B60R 16/02*    (2006.01)
  *B62D 25/06*    (2006.01)
  *H02G 3/04*     (2006.01)
(52) U.S. Cl.
  CPC .......... *B60R 16/0215* (2013.01); *B62D 25/06* (2013.01); *H02G 3/0468* (2013.01)

(58) Field of Classification Search
  CPC ... B60R 16/0215; H02G 3/0468; B62D 25/06
  See application file for complete search history.

(56) References Cited

U.S. PATENT DOCUMENTS

| | | | |
|---|---|---|---|
| 7,769,346 B1 * | 8/2010 | Van Order | B60R 11/0264 |
| | | | 439/297 |
| 2005/0253026 A1 * | 11/2005 | Ogawa | F16L 3/123 |
| | | | 248/74.1 |
| 2011/0025568 A1 * | 2/2011 | Totani | H01Q 1/42 |
| | | | 343/713 |
| 2016/0326745 A1 * | 11/2016 | Lechuga | F24F 13/0254 |
| 2020/0346590 A1 * | 11/2020 | Shane | B60R 16/0222 |
| 2022/0274545 A1 * | 9/2022 | Srinivasagam | H01B 17/583 |

* cited by examiner

*Primary Examiner* — Derek J Battisti
(74) *Attorney, Agent, or Firm* — Schwabe, Williamson & Wyatt, P.C.

(57) ABSTRACT

Assembly 18 for securing a bundle of electrical wiring 26 through a roof 12 of a vehicle and a roof rack 10 for supporting a load relative to the roof 12. The roof rack 10 includes an elongate member 14 configured to support the load, one or more mounting mechanisms 16 configured to mount the elongate member 14 to the roof 12, and the assembly 18. The assembly 18 includes a body 20 configured to be placed across a hole 22 defined in the roof 12, the body 20 defining a wiring aperture 24 extending through the body 20, electrical wiring 26 arranged through the wiring aperture 24 and fixed to the body 20, a securing mechanism 28 for releasably securing the body 20 to the roof 12, and a boot 30 configured to cover the body 20, connect to the elongate member 14, and carry the wiring 26 from the body 20 to the elongate member 14.

17 Claims, 5 Drawing Sheets

ASSEMBLY FOR SECURING ELECTRICAL WIRING THROUGH A ROOF OF A VEHICLE

CROSS-REFERENCE TO RELATED APPLICATION(S)

This application claims priority to Australian patent application no. 2021203576, filed on Jun. 1, 2021, the entirety of which is incorporated by reference herein.

TECHNICAL FIELD

The present disclosure relates, generally, to assemblies for securing electrical wiring through a surface of a vehicle and, particularly, to such assemblies configured to secure the wiring through a roof to extend between the cabin of the vehicle and to a roof rack or a roof-mounted electrically powered device.

BACKGROUND

Where vehicles are often driven off-road or in remote locations with little or no street lighting, it is common to install a light bar or driving light to a vehicle to enhance illumination during night driving. These auxiliary lighting units are typically mounted to a front bumper, bull bar, directly to the roof of the vehicle, or to a roof rack mounted on the roof.

An auxiliary lighting unit is typically powered by a battery installed in the vehicle, either in the engine bay or a cargo-carrying area. Electrical wiring is required to connect between the battery and the lighting unit to supply power to the unit. Routing this wiring can be problematic, often requiring holes to be drilled in one or more surfaces of the vehicle, such as the bonnet or roof, which can allow moisture and dust to enter the vehicle, potentially causing corrosion or otherwise damaging the vehicle. Wiring exposed on the outside of the vehicle is also prone to being damaged, such as by loading cargo on to the roof of the vehicle, or by debris, branches or the like being snagged in the wiring. Furthermore, the retro-fitting of such wiring is considered visually obtrusive and unattractive, particularly when compared to the sophisticated appearance of many modern off-road vehicles.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

According to one aspect, an assembly for securing a bundle of electrical wiring through a roof of a vehicle, the bundle including a plurality of wires, the assembly including: a body configured to be placed against an exterior surface of the roof and across a hole defined in the roof, the body defining a wiring aperture extending through the body; a seal arranged at one side of the body; a wiring insert configured to fit within the wiring aperture and be releasably secured to the body to seal the wiring aperture, at least a portion of the insert being formed around the bundle to cause the wires to be embedded in, and extend through, the wiring insert; at least two fasteners carried by the body to extend from the one side of the body and past the seal; and at least one receiving portion configured to be arranged about the hole and against an interior surface of the roof to allow receiving at least one of the fasteners, such that engaging the at least one fastener with the at least one receiving portion urges the body and seal against, the exterior surface of the roof.

The wires may be spaced apart in the at least a portion of the wiring insert such that a portion of each wire is embedded in the wiring insert.

The wiring insert may include a cap defining a plurality of spaced apertures for receiving and spacing the plurality of wires, and a core moulded against the cap and around the wires.

The assembly may include an insert retaining nut configured to threadeadly engage the body to allow releasably securing the wiring insert in the aperture.

The wiring insert may include a flange and the insert retaining nut be engageable with the body to cause the flange to press against the body to form the seal.

The body may include a threaded sleeve portion surrounding the wiring aperture, and the insert retaining nut be configured to threadedly engage the sleeve portion.

The assembly may include a boot shaped to cover and be releasably mounted to the body.

The body may define a rim, and the boot define an annular groove dimensioned to receive the rim.

The boot may define one or more drain holes at one side of the groove to allow draining fluid from within the boot.

The boot may include a deformable skirt arranged to allow conforming to the roof.

The boot may include a body portion and a tubular portion extending away from the body portion and dimensioned to house the wiring.

The boot may include a roof rack connector configured to be releasably connected to a component of a roof rack, and the tubular portion extends between the body portion and the roof rack connector.

The roof rack connector may have a resiliently deformable annular flange configured to fit to an entry aperture defined in the component of the roof rack.

The roof rack connector may be configured to extend substantially perpendicularly to the annular flange such that the tubular portion partially extends perpendicularly to the flange.

According to another aspect, an assembly for securing a bundle of electrical wiring through a roof of a vehicle, the bundle including a plurality of wires, the assembly including: a first body configured to be placed against an exterior surface of the roof and across a hole defined in the roof, the first body defining a wiring aperture extending through the body; a second body formed around the bundle and within the wiring aperture such that the wires are embedded in, and extend through, the second body; a seal arranged at one side of the body; at least two fasteners carried by the body to extend from the one side of the body and past the seal; and at least one receiving portion configured to be arranged about the hole and against an interior surface of the roof to allow receiving at least one of the fasteners, such that engaging the at least one fastener with the at least one receiving portion urges the body and seal against the exterior surface of the roof.

According to another aspect, an assembly for securing electrical wiring through a roof of a vehicle, the assembly including: a body configured to be placed against an exterior surface of the roof and across a hole defined in the roof, the body defining a wiring aperture extending through the body; a seal arranged at one side of the body; a wiring insert configured to fit within the wiring aperture to arrange the wiring through the aperture, the wiring insert configured to be releasably secured to the body to seal the wiring aperture, and defining at least one conduit extending partially through the wiring insert to terminate at a piercable wall, such that, in use, the piercable wall is pierced to allow one or more wires to be arranged in the at least one conduit to extend through the wiring insert, the, or each, conduit defining a ribbed internal wall to allow gripping the one or more wires arranged in the conduit; at least two fasteners carried by the body to extend from the one side of the body and past the seal; and at least one receiving portion configured to be arranged about the hole and against an interior surface of the roof to allow receiving at least one of the fasteners, such that engaging the at least one fastener with the at least one receiving portion urges the body and seal against the exterior surface of the roof.

The, or each, conduit may define a plurality of annular ribs spaced along a length of the conduit.

According to another aspect, an assembly for securing electrical wiring through a roof of a vehicle, the assembly including: a body configured to be placed against an exterior surface of the roof and across a hole defined in the roof, the body defining a wiring aperture extending through the body; a seal arranged at one side of the body; a wiring insert configured to fit within the wiring aperture to arrange the wiring through the aperture, the wiring insert configured to be releasably secured to the body to seal the wiring aperture, and defining at least one conduit extending partially through the wiring insert to terminate at a piercable wall, such that, in use, the piercable wall is pierced to allow one or more wires to be arranged in the at least one conduit to extend through the wiring insert, the insert defining an annular flange; an insert retention structure configured to releasably engage the body to allow securing the wiring insert in the aperture and pressing against the flange to form a seal with the body; at least two fasteners carried by the body to extend from the one side of the body and past the seal; and at least one receiving portion configured to be arranged about the hole and against an interior surface of the roof to allow receiving at least one of the thread fasteners, such that engaging the at least one fastener with the at least one receiving portion urges the body and seal against the exterior surface of the roof.

The insert retention structure may include a nut configured to threadedly engage the body.

According to another aspect, a vehicle roof rack for supporting a load relative to a roof of a vehicle, the vehicle roof rack including: an elongate member configured to support the load; one or more mounting mechanisms configured to mount the elongate member to the roof and an assembly for securing electrical wiring through the roof and carrying the wiring to the roof rack, the assembly including: a body configured to be placed across a hole defined in the roof, the body defining a wiring aperture extending through the body; electrical wiring arranged through the wiring aperture and fixed to the body; a securing mechanism for releasably securing the body to the roof; and a boot configured to cover the body, connect to the elongate member, and carry the wiring from the body to the elongate member.

The vehicle roof rack may include an electrically powered device carried by the elongate member, and the wiring be arranged to extend from within a cabin of the vehicle, through the hole defined in the roof, through the body, through the boot, through the elongate member, and couple to the device.

The elongate member may define an internal cavity configured to receive the wiring, and define an entry aperture arranged to allow access to the cavity, and wherein the boot is configured to be secured across the entry aperture.

The elongate member may be configured as a slat or side rail of a roof platform.

The assembly may include a wiring insert configured to fit within the wiring aperture and be releasably secured to the body, and the wiring insert be formed around the wiring such that the wiring is embedded in, and extends through, the wiring insert.

The assembly may include a wiring insert which defines a conduit extending partially through the wiring insert, and the, or each, conduit terminates at a piercable wall, such that, in use, the piercable wall is frangible to allow the wiring to be arranged in the conduit to extend through the wiring insert.

The assembly may include an insert retaining nut configured to threadeadly engage the body to allow releasably securing the wiring insert in the aperture.

The wiring insert may include a flange and the insert retaining nut be engageable with the body to cause the flange to press against the body to form a seal.

The body may include a threaded sleeve portion surrounding the wiring aperture, and wherein the insert retaining nut is configured to threadedly engage the sleeve portion.

The securing mechanism may include a plurality of fasteners arranged through the body, and at least one receiving portion be configured to be arranged about the hole to allow receiving at least one of the fasteners to cause the body to be urged against the roof.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompany drawings in which.

DESCRIPTION OF EMBODIMENTS

Figure 1:
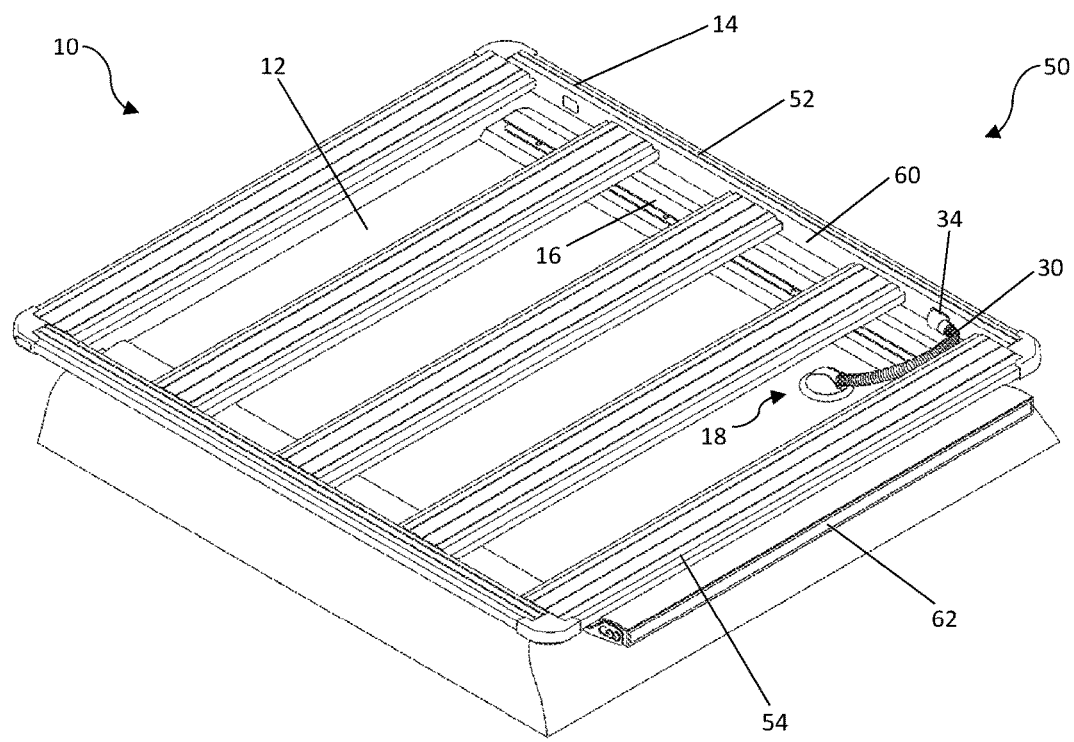
FIG. 1 is a perspective view of a roof rack mounted to a roof of a vehicle and carrying a light bar, and an assembly carrying electrical wiring between the roof and the roof rack.

In the drawings, reference numeral 10 generally designates a vehicle roof rack 10 for supporting a load (not illustrated) relative to a roof 12 of a vehicle. The vehicle roof rack 10 includes an elongate member 14 configured to support the load, one or more mounting mechanisms 16 configured to mount the elongate member 14 to the roof 12, and an assembly 18 for securing electrical wiring 26 (FIG. 6) through the roof 12 and carrying the wiring 26 to the roof rack 10. The assembly 18 includes: a body 20 (FIG. 5) configured to be placed across a hole 22 (FIG. 6) defined in the roof 12, the body 20 defining a wiring aperture 24 extending through the body 20; electrical wiring 26 (FIG. 6) arranged through the wiring aperture 24 and fixed to the body 20; a securing mechanism 28 for releasably securing the body 20 to the roof 12; and a boot 30 configured to cover the body 20, connect to the elongate member 14, and carry the wiring 26 from the body 20 to the elongate member 14.

FIG. 1 shows the roof rack 10 configured as a roof platform 50 and the elongate member 14 configured as a side rail 52 of the platform 50. The platform 50 is mounted by the mounting mechanisms 16 to be operatively above an exterior surface 13 of the roof 12. In other embodiments (not illustrated), the elongate member 14 is configured as a slat 54 of the platform 50. The side rail 52 defines an internal cavity 56 (FIG. 3B) and an entry aperture 58 (FIG. 3B) in a sidewall 60 of the side rail 52 to allow access into the cavity 56. The boot 30 includes a roof rack connector 34 connected to the side rail 52 to cover the entry aperture 58. The arrangement of the assembly 18 and the side rail 52 in this way allows the wiring 26 to be routed from within the cabin (not shown) of the vehicle, through a hole (not visible) in the roof 12, secured to the roof 12 by the assembly 18, and conveyed, by the assembly 18, to the side rail 52.

An operatively front slat 54 is connected to, and carries, an electrically powered device, in the form of a light bar 62. The light bar 62 is arranged to illuminate in front of the vehicle from an elevated position. In other embodiments (not illustrated), the device is in the form of a driving light, illuminated sign, or monitor/screen. The front slat 54 defines an internal cavity and an exit aperture (both not visible) in a sidewall of the slat 54 to allow access into the cavity. The cavity of the slat 54 is arranged to be in communication with the cavity of the side rail 52. The light bar 62 is positioned adjacent the exit aperture. The arrangement of the slat 54, the side rail 52 and the light bar 62 in this way allows the wiring 26 to be conveyed from the assembly 18 to the light bar 62.

Figure 2:
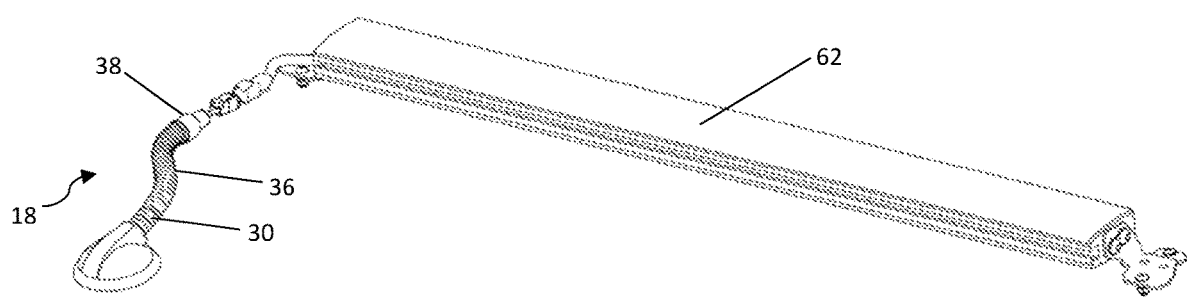
FIG. 2 is a perspective view of a light bar mounted to a roof of a vehicle and an assembly securing electrical wiring between the roof and the roof rack.

FIG. 2 shows the light bar 62 in isolation and the assembly 18 alternatively configured such that the roof rack connector 34 is substituted for a device connector 38. The device connector 38 is releasably securable to a tubular portion 36 of the boot 30 and configured to mechanically couple with an electrical device, in this embodiment, being the light bar 62. In some embodiments, the device connector 38 is configured to also electrically couple the wiring 26 with the device. This arrangement usefully allows the assembly 18 to convey the wiring 26 from the roof 12 directly to the device. For example, this may be practical where the device is roof-mounted, without a roof rack 10, or access to electrical connectors of the device is inhibited by the roof rack 10.

Figure 3B:
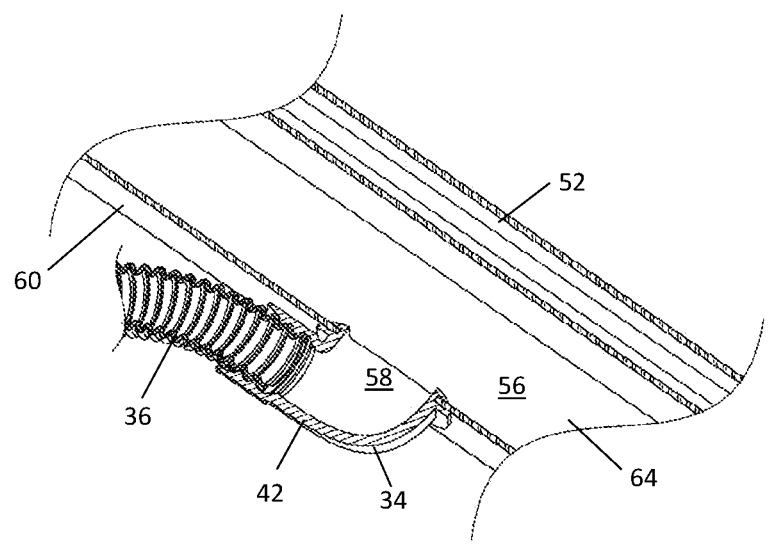
FIG. 3B is a section view of the roof rack and assembly shown in FIG. 3A.
Figure 3A:
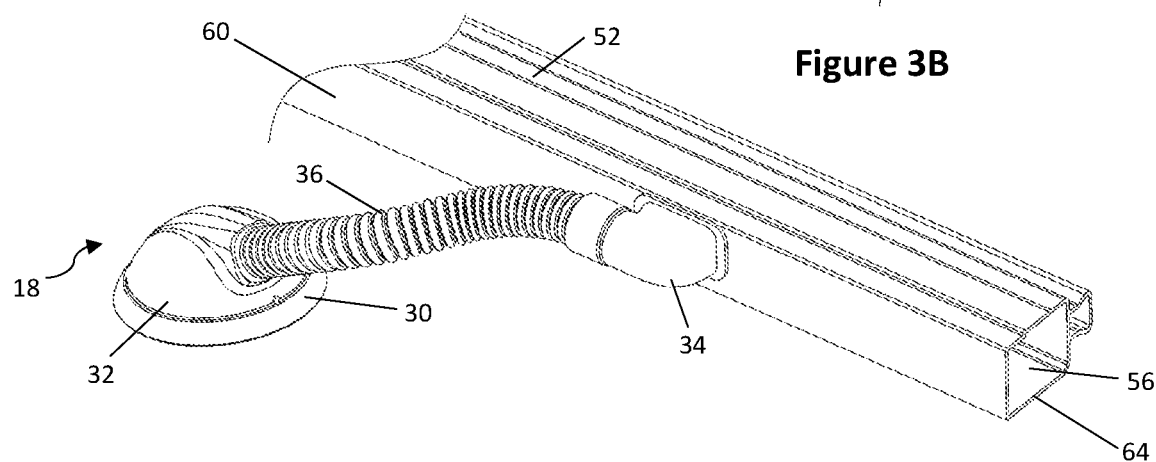
FIG. 3A is a detailed view of the roof rack and assembly shown in FIG. 1.

FIGS. 3A and 3B show the assembly 18 and side rail 52 in isolation. These figures show the internal cavity 56 defined by the side rail 52 and the entry aperture 58 arranged to allow access into the cavity 56. In the illustrated embodiment, the roof rack connector 34 defines a resiliently deformable annular flange 40 dimensioned to be fitted around a periphery of the aperture 58 to engage the sidewall 60. It will be appreciated that, in other embodiments, the roof rack connector 34 is alternatively configured to connect to the side rail 52, such as having snap-fit tabs, defining a thread or bayonet fitting, and/or carrying mechanical fasteners. In yet other embodiments, alternatively or additionally, the connector 34 carries adhesive to allow bonding to the sidewall 60.

FIG. 3B illustrates the configuration of the roof rack connector 34 in detail. The connector 34 has a region 42 shaped to extend at a right angle to the flange 40, such that when connected to the sidewall 60, the region 42 extends perpendicularly to the aperture 58 and parallel to the sidewall 60. This causes the tubular portion 36, which is connected to the connector 34, to partially extend parallel to the sidewall 60. This can usefully arrange the tubular portion 36 alongside the side rail 52 to reduce drag during use, when the vehicle is being driven, and avoid the tubular portion 36 being snagged by cargo being loaded onto the roof platform 50.

FIG. 3B also illustrates the side rail 52 in detail. The side rail 52 includes a tubular region 64 defining the cavity 56, in this embodiment being an elongate hollow channel. The cavity 56 is configured to receive the wiring 26 and convey the wiring along the length of the side rail 52. In this embodiment, the cavity 56 is enclosed to sealingly contain the wiring.

Figure 4:
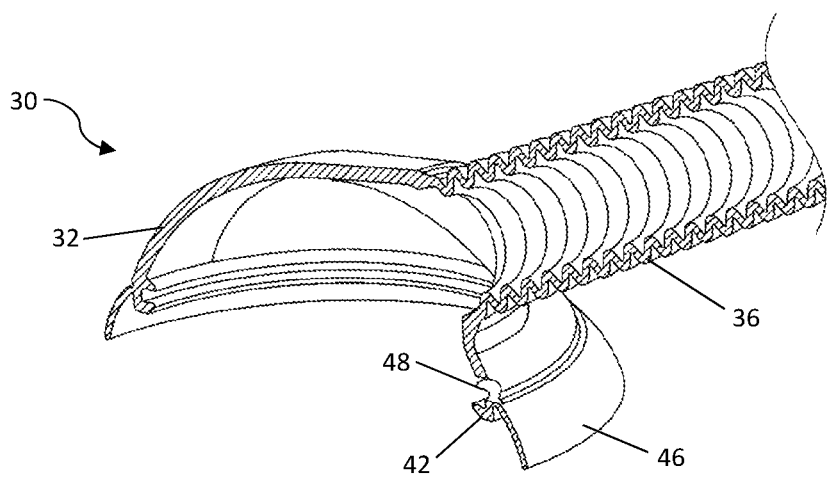
FIG. 4 is a section view of a boot of the assembly shown in FIG. 1 or 2.

FIG. 4 illustrates a cover portion 32 of the boot 30 in detail. In the illustrated embodiment, the cover portion 32 defines an annular groove 42 dimensioned to receive a rim 44 (FIG. 5) of the body 20. A deformable skirt 46 extends from one side of the groove 42, the skirt 46 arranged, in use, to be arranged against and conform to geometry of the vehicle to provide a primary seal. One or more drainage holes 48 are defined at the other side of the groove 42 and arrange to allow draining fluid from inside the boot 30. The tubular portion 36 defines a corrugated structure to allow a limited degree of flexibility whilst maintaining a tubular form.

Figure 5:
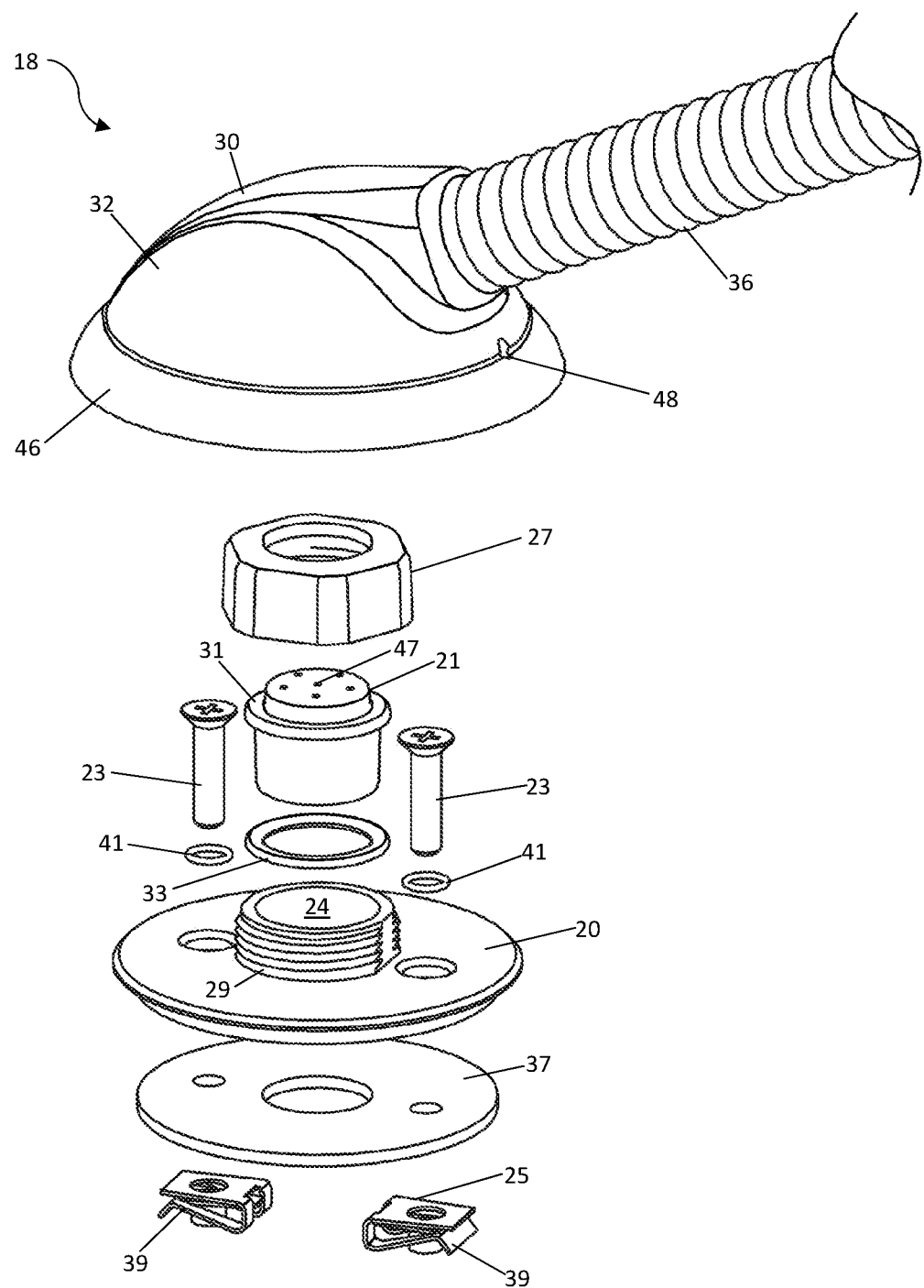
FIG. 5 is an exploded view of the assembly shown in FIG. 1 or 2.

FIG. 5 illustrates the assembly 18 in isolation. It will be appreciated that the assembly 18 is installable and operable independently of the roof rack 10, such as is shown in FIG. 2. The assembly 18 includes: the body 20 which is configured to be placed against the exterior surface 13 of the roof 12 and across the hole 22 (FIG. 6) defined in the roof 12, the body defining the wiring aperture 24 extending through the body 20; a seal 37 arranged at one side of the body 20; a wiring insert 21 configured to fit within the wiring aperture 24 to arrange the wiring 26 through the aperture, the wiring insert 21 configured to be releasably secured to the body 20 to seal the wiring aperture 24; at least two fasteners 23 carried by the body 20 to extend from the one side of the body 20 and past the seal 37; and at least one receiving portion 25 configured to be arranged about the hole 22 and against an interior surface 15 of the roof 12 to allow receiving at least one of the fasteners 23 such that engaging the at least one fastener 23 with the at least one receiving portion 25 urges the body 20 and seal 37 against the roof 12.

The assembly 18 includes an insert retention structure configured to releasably engage the body 20 to secure the insert 21 in the aperture 24. In the illustrated embodiments, the retention structure is in the form of an insert retaining nut 27 configured to threadedly engage the body 20 to allow releasably securing the wiring insert 21 in the aperture 24. This is achieved by engaging a threaded sleeve portion 29 of the body 20. The inclusion of the nut 27 is useful as this allows releasably securing the wiring insert 21 to the body 20 without rotating the insert 21, which could cause twisting of the wiring 26. In other embodiments (not illustrated), the retention structure includes a plate securable with fasteners to the body 20 to trap the insert 21 in the aperture 24. In yet other embodiments (not illustrated), the retention structure includes a cap having bayonet-fitting features configured to engage with bayonet-fitting features defined by, or connected to, the body 20.

A slip ring 35 is arranged between the nut 27 and the insert 21 to enhance relative rotation. In other embodiments (not illustrated), the nut 27 is absent and, instead, the insert 21 is configured to be directly secured to the body 20, such as by being threaded to engage an inner thread of the sleeve 29, or by being deformed by the sleeve 29 to cause frictional engagement.

The wiring insert 21 defines a flange 31 arranged, in use, to abut an end of the sleeved portion 29. The nut 27 is shaped to press against the flange 31 when mounted to the body 20. This arrangement allows the flange 31 to be compressed against the sleeved portion 29 by tightening the nut 27. In the illustrated embodiment, a seal 33 is arranged operatively below the flange 31 to allow sealing between the insert 21 and the body 20. In other embodiments, the flange 31 and/or the insert 21 is resiliently deformable such that compressed the flange 31 with the nut 27 forms a seal.

In the illustrated embodiment, the seal 37 is in the form of a resiliently deformable pad carried by and extending across a base surface of the body 20 to allow pressing against, and sealing to, the roof 12. In this embodiment, the seal 37 is separate to the body 20. In other embodiments (not illustrated), the seal 37 is integrally formed, such as by over-moulding, with the body 20, and may only define an annular ring.

In the illustrated embodiment, the fasteners 23 are threaded and in the form of bolts, and the receiving portion 25 includes two thread receiving U-nuts 39 to allow each fastener 23 to threadedly engage one of the U-nuts 39. Each fastener 23 is associated with an O-ring seal 41 arranged to be compressed between the fastener 23 and the body 20 to form a seal. Each U-nut 39 is configured to be clipped to a rim of the hole 22 to allow receiving and engaging with one of the fasteners 23. The enhances ease of assembling the assembly 18 to the roof 12 from the outside of the vehicle only. In other embodiments (not illustrated), the receiving portion 25 includes two or more nutserts, or a plate, having threaded openings to receive each fastener 23. It will be appreciated that, in other embodiments (not illustrated), the fasteners 23 and receiving portion 25 are alternatively configured to allow engagement, such as the fasteners 23 comprising pop rivets and the receiving portion 25 comprising one or more plates or washers defining apertures dimensioned to receive the pop rivets.

Figure 6:
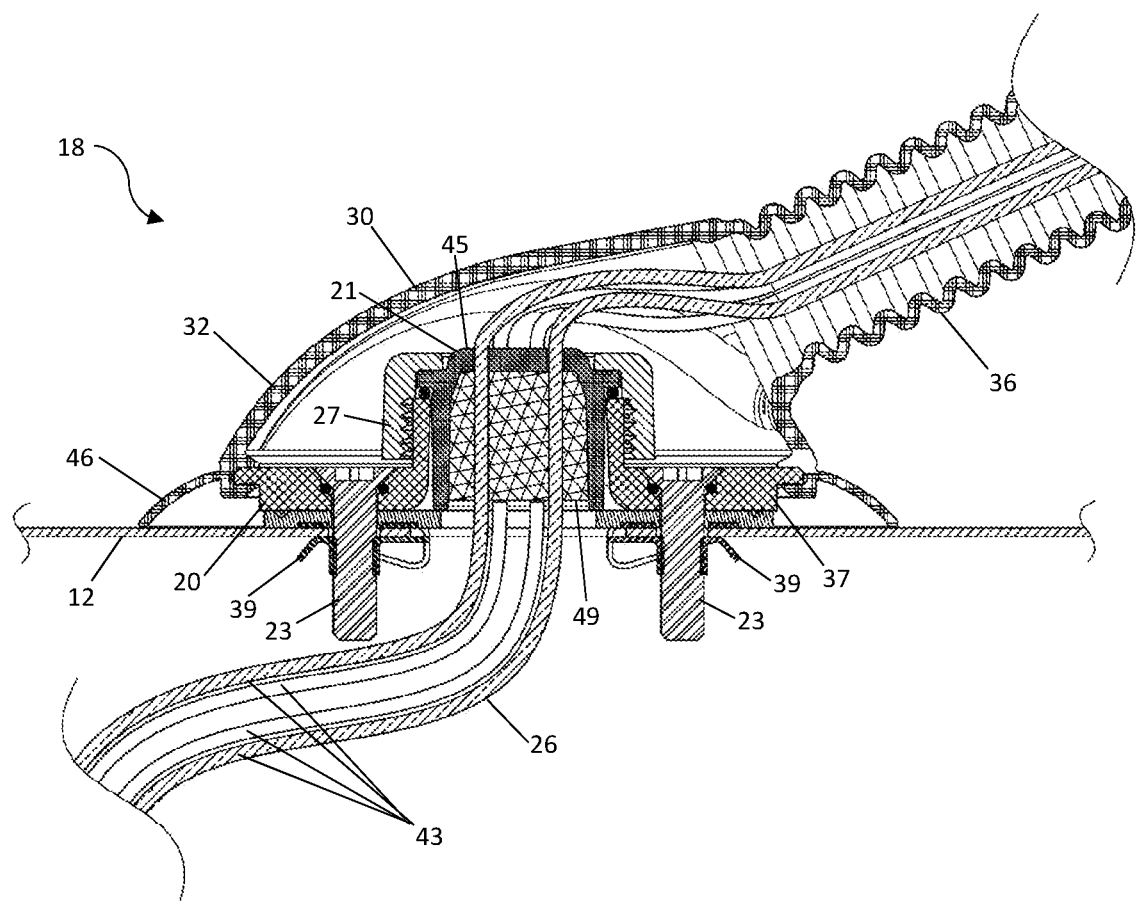
FIG. 6 is a section view of the assembly shown in FIG. 1 or 2.

FIG. 6 illustrates the assembly 18 installed to a roof 12 in detail. The wiring 26 is shown to include a bundle of a plurality of wires 43. The wiring insert 21 is at least partially formed around the wires 43 to cause the wires 43 to be embedded in, and extend through, the insert 21. In this embodiment, the insert 21 includes a cap 45 defining apertures 47 arranged to receive and retain the wires 43 to be spaced apart. The insert 21 also includes a core 49 which is formed against, and typically within, the cap 45 while the wires 43 are arranged through the apertures 47 to cause a portion of each wire 43 to be embedded in the core 49. This means that the portion of each wire 43 is completely enclosed within, and fixed to, the core 49 which can prevent fluid flowing along the wire 43 and through the core 49. This structure is typically achieved by over-moulding the core 49 against the cap 45 and the wires 43. The arrangement of the apertures 47 usefully spaces the wires 43 apart to allow molten core material to flow between the wires 43 during the moulding process. This can reduce or eliminate voids or imperfections in the moulded core 49 and enhance the wires 43 being embedded in the core 49 to robustly seal against the wires 43. It will be appreciated that other moulding or casting approaches may be appropriate. This approach advantageously means that each wire 43 is sealingly engaged with the insert 21, which, in conjunction with the other components of the assembly 18, substantially inhibits fluid penetrating into the hole 22 in the roof 12. Also, providing the wires 43 on the outside of the roof 12 to be separate from each other and bonded to the insert 21 allows the wires 43 to be easily routed to supply power to different circuits or devices, avoiding requiring splicing a multi-wire cable which can increase risk of leaks, mechanical failure and/or costs.

Figure 7:
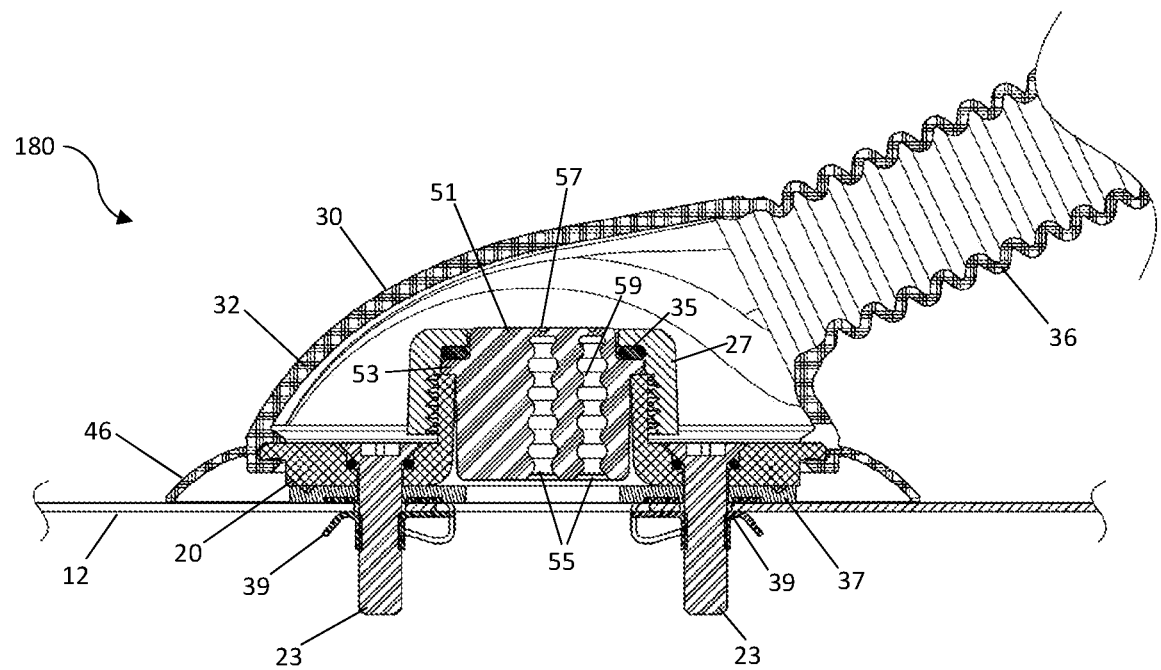
FIG. 7 is a section view of an alternative embodiment of the assembly shown in FIG. 1 or 2.

FIG. 7 illustrates an alternative embodiment of the assembly 180 installed to the roof 12, whereby common reference numerals to the assembly 18 described above indicate common features. The assembly 180 includes a wiring insert 51 configured to fit within the wiring aperture 24 to arrange the wiring 26 through the aperture 24. The wiring insert 51 is configured to be releasably secured to the body 20 to seal the wiring aperture 24. In the illustrated embodiment, the insert 51 includes an annular flange 53 arranged, in use, to abut the end of the sleeved portion 29. This arrangement allows the flange 51 to be compressed by the insert retention structure, in this embodiment, being against the sleeved portion 29 of the body 20 by the nut 27. It will be appreciated that in other embodiments, the flange 53 may be absent. For example, in such embodiments, the insert 52 may define one or more tapered regions to allow sealing against the body 20.

The insert 51 defines a wiring conduit 55 which extends only partially through the insert 51 to terminate at a piercable end wall 57. The end wall 57 is dimensioned to be sufficiently thin, in the region of 1-2 mm, to readily allow the wall 57 to be manually pierced and the wiring 26 to be arranged through the conduit 55 and, consequently, through the insert 51. It will be appreciated that the insert 51 may define more than one conduit terminating at the piercable wall 57 to selectively allow multiple wires, or bundles of wires, to be arranged through the insert 51.

In the illustrated embodiment, the conduit 55 defines a ribbed internal wall to allow gripping the wiring 26 arranged through the conduit 55. In the illustrated embodiments, the ribbed wall defines an array of annular ribs 59 spaced longitudinally along the conduit 55. The annular arrangement of the ribs 59 can inhibit fluid travelling past a wire retained in the conduit 55. In other embodiments (not illustrated), the conduit 55 defines longitudinally extending ribs, or a combination of annular and longitudinal ribs, where at least the longitudinal ribs can provide strain relief to the wire(s) arranged adjacent the rib. It will be appreciated that in other embodiments, the ribs 59 may be absent.

Figure 8:
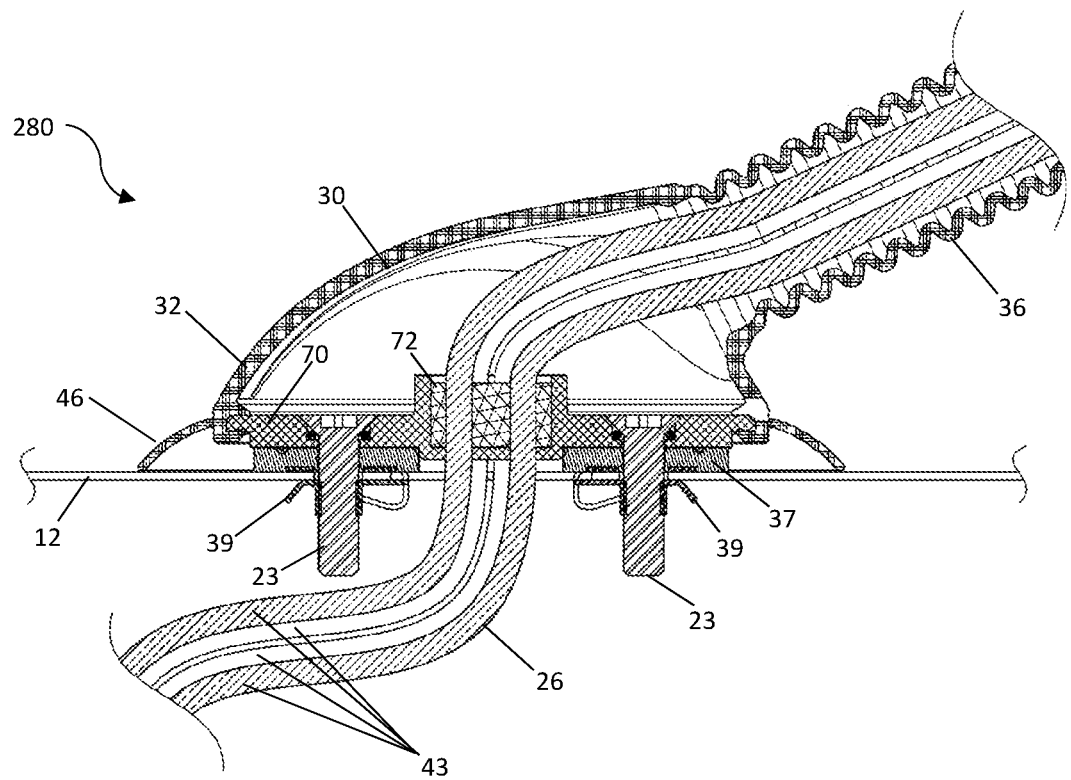
FIG. 8 is a section view of a further alternative embodiment of the assembly shown in FIG. 1 or 2.

FIG. 8 illustrates a further alternative embodiment of the assembly 280 installed to the roof 12, whereby common reference numerals to the assembly 18 described above indicate common features. The assembly 280 includes: a first body 70 configured to be placed against the exterior surface 13 of the roof 12 and across the hole 22 defined in the roof 12, the first body 70 defining a wiring aperture 24 extending through the body 70; and a second body 72 formed around the bundle of wires 43 and within the wiring aperture 24 such that the wires 43 are embedded in, and extend through, the second body 72. The second body 72 is typically configured such that a portion of each wire 43 is completely enclosed within, and fixed to, the body 72 which can prevent fluid flowing along the wire 43 and through the body 72. This structure is typically achieved by overmoulding the second body 72 against the first body 70 and the wires 43.

Installation of the assembly 18, 180 involves: drilling the hole 22 in the roof 12 of the vehicle, and holes for the fasteners 23; mounting the body 20 across the hole 22 such that the wiring aperture 24 is substantially aligned with the hole 22 and the seal 37 is placed against the roof 22; securing the insert 21 in the aperture 24 so that the wiring 26 extends through the hole 22 and the insert 21 seals the aperture 24; engaging the fasteners 23 with the receiving portions 25, and tightening the fasteners 23 to urge the body 20 against the roof 12.

When installed in this way, the assembly 18, 180 fixes the wiring 26 through the hole 22 in the roof 12 of the vehicle, and seals against the roof 12 to inhibit fluid entering the hole, either directly or through the assembly 18, 180. This usefully reduces or prevents damage cause by fluid ingress into the vehicle. Furthermore, installation can be completed by accessing only the outside of the vehicle, reducing complexity and duration of the installation procedure. It will be appreciated that the assembly 18, 180 is not limited to being mounted to the roof 12 and can alternatively be mounted to other surfaces of the vehicle if required, such as the bonnet, fender, or in the cargo bay.

Installation of the roof rack 10 involves: drilling the hole 22 in the roof of the vehicle 22; securing the one or more mounting mechanisms 16 to the roof 12: mounting the elongate member 12 to the one or more mounting mechanisms 16; and mounting the assembly 18 to the roof 12 to secure the wiring 26 through the roof 12 and carrying the wiring 26 to the roof rack. Mounting the assembly 18 in this scenario involves: placing the body 20 across the hole 22 such that the wiring aperture 24 is substantially aligned with the hole 22; arranging the wiring 26 through the aperture 24 and fixing the wiring 26 to the body 20; operating the securing mechanism to secure the body 20 to the roof 12; and mounting the boot 30 to the body 20 such that the cover portion 32 covers the body 20, the roof rack connector 34 is connected to the roof rack 10, and the wiring 26 is carried to the roof rack 10. Where the roof rack 10 carries an electrically powered device, such as the light bar, the wiring 26 may be connected at one end to a power source, such as a battery, and the other end be routed from or through the roof rack 10 to be connected to the device to allow powering the device.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An assembly for securing a bundle of electrical wiring through a roof of a vehicle, the bundle including a plurality of wires, the assembly including:
   a body configured to be placed against an exterior surface of the roof and across a hole defined in the roof, the body defining a wiring aperture extending through the body;
   a seal arranged at one side of the body;
   a wiring insert configured to fit within the wiring aperture and be releasably secured to the body to seal the wiring aperture, at least a portion of the insert being formed around the bundle to cause the wires to be embedded in, and extend through, the wiring insert, the wires being spaced apart in the at least a portion of the wiring insert such that a portion of each wire is embedded in the wiring insert, and the wiring insert includes a cap defining a plurality of spaced apertures for receiving and spacing the plurality of wires, and a core molded against the cap and around the wires;
   at least two fasteners carried by the body to extend from the one side of the body and past the seal; and
   at least one receiving portion configured to be arranged about the hole and against an interior surface of the roof to allow receiving at least one of the fasteners, such that engaging the at least one fastener with the at least one receiving portion urges the body and seal against the exterior surface of the roof.

2. An assembly for securing a bundle of electrical wiring through a roof of a vehicle, the bundle including a plurality of wires, the assembly including:
   a body configured to be placed against an exterior surface of the roof and across a hole defined in the roof, the body defining a wiring aperture extending through the body;
   a seal arranged at one side of the body;
   a wiring insert configured to fit within the wiring aperture and be releasably secured to the body to seal the wiring aperture, at least a portion of the insert being formed around the bundle to cause the wires to be embedded in, and extend through, the wiring insert;
   at least two fasteners carried by the body to extend from the one side of the body and past the seal; and
   at least one receiving portion configured to be arranged about the hole and against an interior surface of the roof to allow receiving at least one of the fasteners, such that engaging the at least one fastener with the at least one receiving portion urges the body and seal against the exterior surface of the roof; and
   an insert retaining nut configured to threadedly engage the body to allow releasably securing the wiring insert in the aperture.

3. The assembly according to claim 2, wherein the wiring insert includes a flange and the insert retaining nut is engageable with the body to cause the flange to press against the body to form the seal.

4. The assembly according to claim 1, including a boot shaped to cover and be releasably mounted to the body.

5. The assembly according to claim 4, wherein the body defines a rim, and the boot defines an annular groove dimensioned to receive the rim.

6. The assembly according to claim 5, wherein the boot defines one or more drain holes at one side of the groove to allow draining fluid from within the boot.

7. The assembly according to claim 5, wherein the boot includes a deformable skirt arranged to allow conforming to the roof.

8. The assembly according to claim 4, wherein the boot includes a body portion and a tubular portion extending away from the body portion and dimensioned to house the wiring.

9. The assembly according to claim 8, wherein the boot includes a roof rack connector configured to be releasably connected to a component of a roof rack, and the tubular portion extends between the body portion and the roof rack connector.

10. The assembly according to claim 9, wherein the roof rack connector has a resiliently deformable annular flange configured to fit to an entry aperture defined in the component of the roof rack.

11. An assembly for securing electrical wiring through a roof of a vehicle, the assembly including:

a body configured to be placed against an exterior surface of the roof and across a hole defined in the roof, the body defining a wiring aperture extending through the body;

a seal arranged at one side of the body;

a wiring insert configured to fit within the wiring aperture to arrange the wiring through the aperture, the wiring insert configured to be releasably secured to the body to seal the wiring aperture, and defining at least one conduit extending partially through the wiring insert to terminate at a pierceable wall, such that, in use, the pierceable wall is pierced to allow one or more wires to be arranged in the at least one conduit to extend through the wiring insert, the, or each, conduit defining a ribbed internal wall to allow gripping the one or more wires arranged in the conduit;

at least two fasteners carried by the body to extend from the one side of the body and past the seal;

at least one receiving portion configured to be arranged about the hole and against an interior surface of the roof to allow receiving at least one of the fasteners, such that engaging the at least one fastener with the at least one receiving portion urges the body and seal against the exterior surface of the roof; and an insert retention structure configured to releasably engage the body to allow securing the wiring insert in the aperture and pressing against the flange to form a seal with the body, wherein the insert retention structure includes a nut configured to threadedly engage the body.

12. The assembly according to claim 11, wherein the, or each, conduit defines a plurality of annular ribs spaced along a length of the conduit.

13. A vehicle roof rack for supporting a load relative to a roof of a vehicle, the vehicle roof rack including:
   an elongate member configured to support the load;
   one or more mounting mechanisms configured to mount the elongate member to the roof;
   an assembly according to claim 1; and
   a boot configured to cover the body of the assembly, connect to the elongate member, and carry the wiring from the body to the elongate member.

14. The vehicle roof rack according to claim 13, including an electrically powered device carried by the elongate member, and wherein the wiring is arranged to extend from within a cabin of the vehicle, through the hole defined in the roof, through the body, through the boot, through the elongate member, and couple to the device.

15. The vehicle roof rack according to claim 14, wherein the elongate member defines an internal cavity configured to receive the wiring, and defines an entry aperture arranged to allow access to the cavity, and wherein the boot is configured to be secured across the entry aperture.

16. The vehicle roof rack according to claim 13, wherein the elongate member is configured as a slat of a roof platform.

17. The vehicle roof rack according to claim 13, wherein the elongate member is configured as a side rail of a roof platform.

* * * * *